(12) United States Patent
Yang et al.

(10) Patent No.: US 8,049,752 B2
(45) Date of Patent: Nov. 1, 2011

(54) SYSTEMS AND METHODS OF DETERMINING SAMPLING RATES FOR VOLUME RENDERING

(75) Inventors: Lining Yang, East Windsor, NJ (US); Udeepta D. Bordoloi, Milpitas, CA (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1048 days.

(21) Appl. No.: 11/787,951

(22) Filed: Apr. 18, 2007

(65) Prior Publication Data

US 2008/0024515 A1  Jan. 31, 2008

Related U.S. Application Data

(60) Provisional application No. 60/833,121, filed on Jul. 25, 2006.

(51) Int. Cl.
*G06T 17/00* (2006.01)
*G06T 15/50* (2011.01)
*G09G 5/00* (2006.01)
*G09G 5/02* (2006.01)

(52) U.S. Cl. ........ 345/424; 345/420; 345/426; 345/428; 345/592; 345/629

(58) Field of Classification Search .................. None
See application file for complete search history.

(56) References Cited

U.S. PATENT DOCUMENTS

| | | | |
|---|---|---|---|
| 2004/0125103 A1* | 7/2004 | Kaufman et al. | 345/419 |
| 2005/0168460 A1* | 8/2005 | Razdan et al. | 345/419 |
| 2005/0285858 A1 | 12/2005 | Yang et al. | 345/420 |
| 2006/0274065 A1* | 12/2006 | Buyanovskiy | 345/424 |

OTHER PUBLICATIONS

Nelson Max; "Optical Models for Direct Volume Rendering"; University of California, Davis, and Lawrence Livermore national Laboratory, Jun. 1995.

Marc Levoy; "Display of Surfaces from Volume Data"; Jun. 1987 (revised Feb. 1988); Computer Science, Department University of North Carolina; Chapel Hill, NC 27514.

(Continued)

*Primary Examiner* — Xiao M. Wu
*Assistant Examiner* — Tize Ma
(74) *Attorney, Agent, or Firm* — Peter L. Kendall

(57) ABSTRACT

A system and method of determining a sampling rate for rendering a volumetric image, the method includes determining a regional variation value representing regional data, color, and/or alpha variation. An accumulated opacity value is determined that represents opacity accumulated over a ray in the image, and a regional opacity value is determined that represents regional opacity. A quality setting is accessed that represents a default image quality, and the sampling rate is adjusted as a function of the regional variation value, the accumulated opacity value, the regional opacity value, and the quality setting. The regional variation value may be determined by iteratively generating a maximum regional variation table during pre-processing, quantizing the maximum regional variation table where the transfer function is defined based on a histogram of the volumetric image, and computing the regional variation value using the maximum regional variation table. Also disclosed are methods to calculate the accumulated opacity value, and the regional opacity value, as well as systems and methods of rendering a volumetric image by using the sampling rate.

23 Claims, 12 Drawing Sheets

OTHER PUBLICATIONS

Marc Levoy; "Volume Rendering by Adaptive Refinement"; Jun. 1988 (revised Jan. 1989); Computer Science Department University of North Carolina Chapel Hill, NC 27599.

Phillippe Lacroute, et al.; "Fast Volume Rendering Using a Shear-Warp Factorization of the Viewing Transformation" Computer Science Laboratory, Stanford University, Sep. 1995.

Marc Levoy; "Efficient Ray Tracing of Volume Data"; University of North Carolina, Jul. 1990.

John Pawasauskas; "Volume Visualization With Ray Casting"; CS563—Advanced Topics in Computer Graphics; Feb. 18, 1997.

* cited by examiner

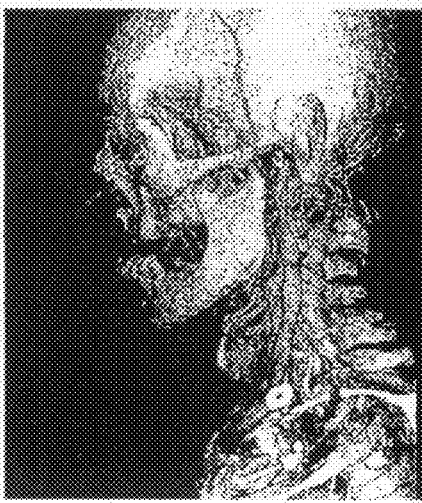 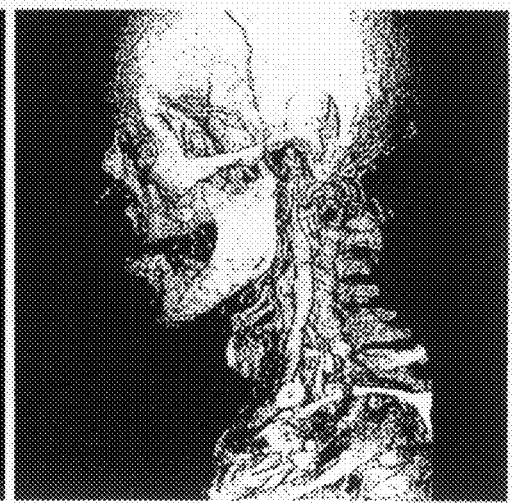
FIG. 12A        FIG. 12B
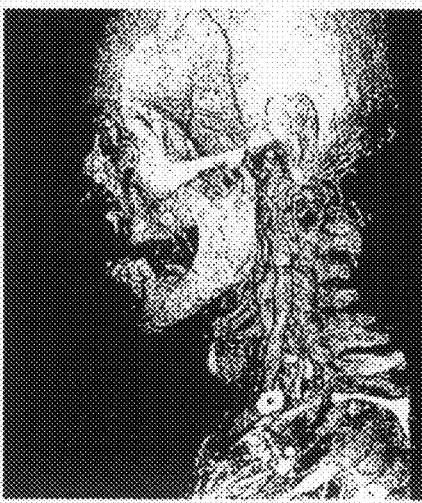 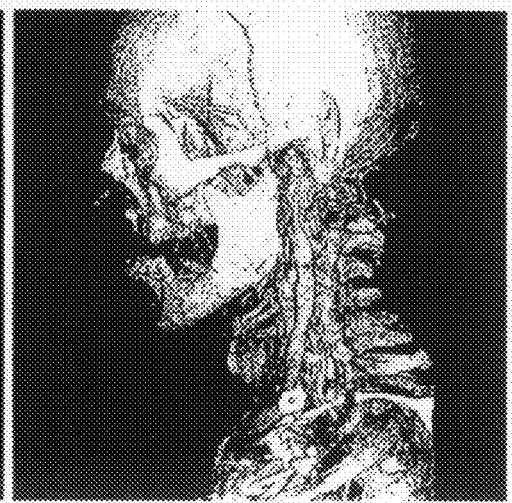
FIG. 13A        FIG. 13B

SYSTEMS AND METHODS OF DETERMINING SAMPLING RATES FOR VOLUME RENDERING

CROSS-REFERENCE TO RELATED APPLICATIONS

This application claims a priority benefit to provisional application Ser. No. 60/833,121, filed on Jul. 25, 2006 and entitled "Apparatus and method for providing data dependent sampling for high quality fast direct volume rendering," which is hereby incorporated by reference in its entirety herein.

BACKGROUND

1. Field of the Invention

This invention relates generally to volume rendering for computer-aided diagnosis (CAD) in medical imaging. More specifically, the present invention is directed to systems and methods of determining sampling rates for volume rendering based on regional variations, regional and accumulated opacities, and quality settings.

2. Background Discussion

Direct volume rendering is an important technique to visualize three-dimensional (3-D) datasets from medical and other sources. With the advance of the computation power and medical devices, the sizes of the 3D volumetric datasets are expanding quickly. The Visible Human project from the National Library of Medicine produced massive datasets with the size of 512×512×1728 (864 MB). Typical Computed Tomography (CT) machines from Siemens® Medical Solutions can generate a pixel image dataset at a size of 512×512× 6000 (3 GB). The capacity to visualize such datasets with high interactivity and high image quality is helpful to medical professionals in diagnosing disease.

Direct volume rendering is a well studied problem in the visualization community. Raycasting, splatting, shearwarp and 3D texture mapping are some of the most popular volume rendering techniques. Among these technologies, raycasting can generate the highest quality images and the algorithms scale well with the increase of the dataset size. Rendering quality can be improved in the ray-casting technique by increasing the sampling rate in 3 dimensions. However, interactivity is difficult to achieve using the brute-force approach due to the intensive memory access and computational nature of the algorithm.

In order to speed up ray-cast rendering, techniques like space leaping and early ray termination can be used. They are particularly effective if the transfer function used for rendering indicates a high degree, or a high proportion, of empty space (totally transparent) or occluded space by an opaque object (early ray termination). On the contrary, if the transfer function reveals a high degree, or high proportion, of partial translucency but no completely transparent regions, space leaping and early ray termination techniques are not very effective. Therefore, for translucent transfer functions, even with these optimization methods, ray-casting can be very slow. If super-sampling is used for higher resolution rendering, performance will be even slower and therefore, interactivity is no longer possible.

Therefore, it would be an advancement in the state of the art to provide a system and method of efficient interactive volume rendering of large datasets that does not sacrifice image quality.

SUMMARY

An embodiment of the invention improves the performance of rendering of the translucent region during ray-casting without visually reducing the image quality. To achieve this, an embodiment of this invention uses a reduced path octree data structure to evaluate the local data and color variations as well as the translucency of the octree node. The information is used with the quality setting to dynamically change the sampling rate from approximately 0.1 per voxel for non-changing and very translucent regions to up to approximately 20 samples per voxel for highly opaque and/or large regional data/color variation. This achieves high performance and high quality ray-casting image rendering for highly translucent transfer functions.

Thus, an embodiment of the present invention is directed to systems and methods of volume rendering using sampling rates which are based on regional variations, regional and accumulated opacities, and quality settings.

Accordingly, one embodiment of the present invention is directed to a method of adjusting a sampling rate for rendering an image. This method includes providing an initial sampling rate. A regional variation value is determined that represents regional data, color, and/or alpha variation. An accumulated opacity value is determined that represents opacity accumulated over a ray in the image. A regional opacity value is determined that represents regional opacity. A quality setting is accessed that represents a default sampling rate and the sampling rate is adjusted as a function of the regional variation value, the accumulated opacity value, the regional opacity value, and the quality setting.

Another embodiment of the present invention is directed to a method of rendering a volumetric image. This method includes forming a reduced path octree of the volumetric image having n levels. Each nth level node is visited, or sampled, along a ray through the volumetric image. An accumulated opacity value is generated along each ray while visiting each nth level node. A regional variation value is calculated that represents data, color, and/or alpha variation at each nth level node. A regional opacity value is calculated that represents regional opacity at each nth level node. A quality setting is accessed that represents a default sampling rate. A sampling rate is determined for each nth level node as a function of the regional variation value, the accumulated opacity value, the regional opacity value, and the quality setting. Each voxel intensity is sampled at each nth level node at the sampling rate and each sample is composited into a rendering of said volumetric image.

Yet another embodiment of the present invention is directed to the method of rendering a volumetric image described above, in which when forming the reduced path octree, disjoint groups of adjacent voxels of the image are formed into one or more first level nodes. Disjoint groups of adjacent ith level nodes of the octree are formed into one or more (i+1)th level nodes, and each ith level node includes a minimum intensity value and a maximum intensity value.

Yet another embodiment of the present invention is directed to the method of rendering a volumetric image described above, in which when visiting each nth level node, if the nth level node is non-empty, sampling each lower level node contained therein along said ray. If the lower level node is non-empty repeating the steps of sampling each next lower level node until an empty node or voxel level is reached.

Yet another embodiment of the present invention is directed to the method of rendering a volumetric image described above, in which the minimum intensity value of a node includes a minimum intensity of all voxels contained within the node, and the maximum intensity value of a node includes a maximum intensity of all voxels contained within the node. The method also includes the additional step of utilizing the minimum and maximum intensity values to calculate the regional opacity value.

Yet another embodiment of the present invention is directed to the method of rendering a volumetric image described above, in which the function has variable coefficients which are selected to modulate the regional variation value, the accumulated opacity value, the regional opacity value, and the quality setting.

Yet another embodiment of the present invention is directed to the method of rendering a volumetric image described above, in which the volumetric image includes a plurality of digitized intensities corresponding to a domain of voxels in a 3-dimensional space.

Yet another embodiment of the present invention is directed to a method of determining a sampling rate. This method includes accessing a regional variation value, accessing an accumulated opacity value, and determining the sampling rate as a function of the regional variation value and the accumulated opacity value.

Yet another embodiment of the present invention is directed to the method of determining a sampling rate described above, in which the accumulated opacity value represents opacity accumulated over a ray in a volumetric image.

Yet another embodiment of the present invention is directed to the method of determining a sampling rate described above, where the regional variation value represents regional data, color, and/or alpha variation.

Yet another embodiment of the present invention is directed to the method of determining a sampling rate described above, in which the step of accessing a regional variation value also includes computing color gradients of each color component for each voxel. The method also includes determining a maximum gradient as a function of the color gradients, and determining the regional variation value as a function of the maximum gradient.

Yet another embodiment of the present invention is directed to the method of determining a sampling rate described above that also includes accessing minimum and maximum data values from an octree node. Minimum and maximum transfer function values are calculated based on the minimum and the maximum data values. A sampling distance is determined that represents a distance between two adjacent samples. The regional variation value is determined as a function of the minimum and maximum transfer function values and the sampling distance.

Yet another embodiment of the present invention is directed to the method of determining a sampling rate described above, where the step of accessing a regional variation value also includes generating a maximum regional variation table during pre-processing, and generating the regional variation value from the maximum regional variation table.

Yet another embodiment of the present invention is directed to the method of determining a sampling rate described above, in which the maximum regional variation table is generated by computing each table entry iteratively.

Yet another embodiment of the present invention is directed to the method of determining a sampling rate described above, in which the step of accessing a regional variation value also includes quantizing the maximum regional variation table by a predetermined factor.

Yet another embodiment of the present invention is directed to the method of determining a sampling rate described above, in which the step of accessing a regional variation value also includes generating a histogram, and quantizing the maximum regional variation table as a function of the histogram.

Yet another embodiment of the present invention is directed to the method of determining a sampling described above, in which the step of accessing a regional variation value also includes determining a limited range in which a transfer function is defined, and quantizing the maximum regional variation table in the limited range.

Yet another embodiment of the present invention is directed to the method of determining a sampling rate described above that also includes accessing a regional opacity value, and adjusting the sampling rate as a function of the regional opacity value.

Yet another embodiment of the present invention is directed to the method of determining a sampling rate described above, where the step of accessing a regional opacity value includes generating an alpha summed area table, determining a minimum and a maximum of the area summed alpha table, and calculating the regional opacity value from the minimum and the maximum of the alpha summed area table.

Yet another embodiment of the present invention is directed to the method of determining a sampling rate described above that also includes accessing a quality setting, and adjusting the sampling rate as a function of the quality setting.

Yet another embodiment of the present invention is directed to the method of determining a sampling rate described above, where the quality setting represents a default sampling rate and thus a default image quality.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIGS. 12A and 12B show a comparison of rendering results in which performance was doubled when using the principles embodiments of the present invention; and FIGS. 13A and 13B show a comparison of rendering results under the same performance in accordance with an embodiment of the present invention.

DETAILED DESCRIPTION

Figure 1:
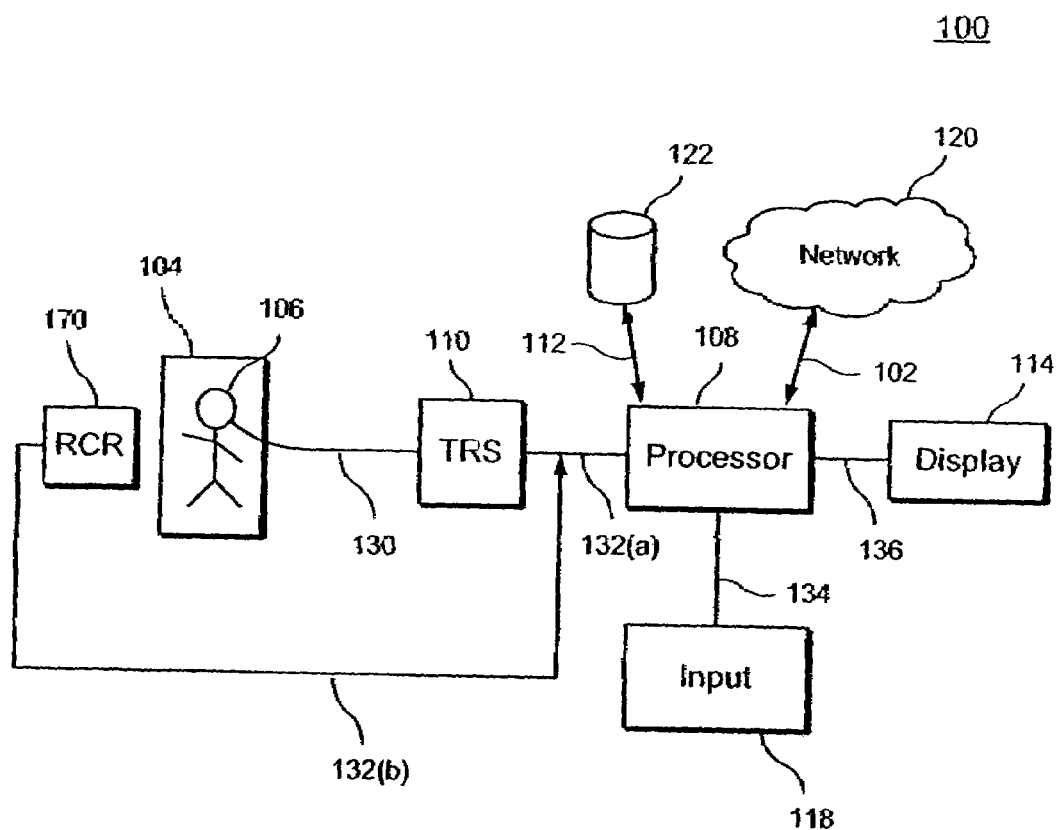
FIG. 1 illustrates a medical imaging system utilizing the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

High quality and high interactivity for large volume rendering are very important to clinical workflow. To achieve high quality or high resolution, super sampling along the viewing direction is often used during the rendering. However, high sampling rate increases proportionally the computational intensity and reduces the interactivity. This becomes even more of a problem if a translucent transfer function prevents space leaping and/or early ray termination from being effective. Additionally, there are many regions in the volume where the data or color variations are small, and/or the regional opacity is low. A high sampling rate in such regions will not improve rendering quality noticeably. Thus, one embodiment of the present invention is a method to dynamically change the sampling rate according to regional data and/or color variations, regional and accumulative opacities, and quality settings. This achieves high quality and performance (high interactivity) at the same time. From performance tests, the new method doubles the rendering performance for some difficult translucent transfer functions without visual quality degradation.

An image may be multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" refer to images or volumes, as appropriate, in a digital or digitized format acquired via a digital acquisition system or via conversion from an analog image.

A voxel ("volumetric pixel" or 3D pixel) is a volume element, representing a value on a regular grid in three dimensional space. Voxels are analogous to pixels, which represent 2D image data. Voxels are frequently used in the visualization and analysis of medical and scientific data. Some true 3D displays use voxels to describe their resolution. For example, a display might be able to show 512×512×512 voxels. As with pixels, voxels themselves typically do not contain their position in space (their coordinates); but rather, their coordinates are inferred based on their positions relative to other voxels (i.e., their positions in the data structure that makes up a single volume image). The value of a voxel may represent various properties. In CT scans, the values are expressed in Hounsfield units, representing the opacity of an imaged material to X-rays. Other units are used for MRI and ultrasound images.

An octree is a data structure used to efficiently traverse a 3D dataset representing a volumetric image. In one exemplary, non-limiting method of constructing an octree, each group of 8 adjacent voxels of a dataset are grouped into a first-level parent node. In a 512×512×512 dataset, one obtains 256×256×256 first level nodes of size 2×2×2. Then, each group of 8 adjacent first-level nodes are grouped into the next level parent node, etc. This process can be repeated until every voxel in the dataset has been so grouped, with the top level node forming the top of the octree structure. The top level node of an octree is referred to as the root node, which usually contains information about the entire dataset volume. Each intermediate layer node contains information about the nodes at the next lower level. During run-time ray casting, each ray is traced by traversing the octree first from the root node. If the parent node indicates that it is empty, then the entire subvolume is empty and nothing needs to be done. Otherwise, the ray traverses the child nodes at the next lower level. This technique of skipping empty nodes and visiting the next lower level node if a parent node is non-empty is repeated until the ray visits an individual voxel, at which point the voxel is sampled, i.e., via tri-linear interpolation.

An octree data structure may be optimized for efficient traversal by associating with each node at each level a minimum and a maximum value for all of the nodes/voxels contained within that node. This type of octree is called a "min-max" reduced path octree, and is described in detail in U.S. patent application Ser. No. 11/158,879 to Lining Yang and Min Xie, entitled "System and method for fast volume rendering," filed Jun. 22, 2005 (U.S. Publication Number 2005-0285858), the entirety of which is incorporated by reference herein.

Volume rendering is a technique for visualizing sampled scalar functions of three spatial dimensions (volume data, volumetric image, etc.) by computing 2D projections of a colored semi-transparent gel. Direct volume rendering of 3D data may be performed using ray-casting, splatting, shearwarp and 3D texture mapping. There are several MIP rendering methods such as shearwarp in which the viewing transformation is transformed such that the nearest face of the volume becomes axis aligned with an off-screen image buffer with a fixed scale of voxels to pixels. The volume is then rendered into this buffer using the far more favorable memory alignment and fixed scaling and blending factors. Once all slices of the volume have been rendered, the buffer is then warped into the desired orientation and scale in the displayed image.

Another technique is splatting, in which quality is traded for speed. In the splatting technique, every volume element is splatted (like snow balls) on to the viewing surface from in back to front order. These splats are rendered as disks whose properties (color and transparency) vary diametrically in normal (Gaussian) manner. Flat disks and those with other kinds of property distribution are also used depending on the application.

Yet another technique includes ray-cast based methods. This technique projects the image by casting rays through the volume. In ray casting, a ray is generated for each desired image pixel. Using a simple camera model, the ray starts at the center of the projection of the camera (usually the eye point) and passes through the image pixel on the imaginary image plane floating in between the camera and the volume to be rendered.

An embodiment of the present invention may be applied to cardiac or peripheral radiography, CT, MRI, ultrasound, or images from any other imaging modality. Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs. Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack. Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

FIG. 1 illustrates a medical imaging system 100 utilizing the present invention. Medical imaging system 100 includes a processing device 108, a display module 114, an input module 118, a transmitter module 110, a receiver unit 170, a remote storage 122, a network 120, a patient 106, and an examination table 104.

A patient 106 is supported by table 104. Transmitter unit, or emitter unit, 110 and receiver unit, or detection unit, 170 produce image data related to a patient 106. The transmitter unit 110 generates imaging medium 130, which may be x-rays, positrons, electrons, ultrasound, or other imaging medium. The transmitter unit 110 may be, for example, an x-ray emitting unit, such as an x-ray tube, and receiver unit 170 may be, for example, an x-ray detecting unit, such as an x-ray detector.

In an x-ray embodiment, the emitting unit 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit 170 is adapted to absorb and measure the emitted x-rays.

The imaging may also be implemented using Computed Tomography (CT), originally known as computed axial tomography (CAT or CT scan), in which digital geometric processing is used to generate a three dimensional image of internals of an object from a large series of two-dimensional x-ray images taken around a single axis of rotation. An iodine dye, or other contrast material, may be used to make structures and organs easier to see on the CT pictures. The dye may be used to check blood flow, locate tumors, and examine other medical conditions. Additionally, positron emission tomography (PET) imaging may also be used. In PET imaging, a short-lived radioactive tracer isotope, which decays by emitting a positron, and which has been chemically incorporated into a metabolically active molecule, is injected into the patient.

Transmitter unit, or emitting unit, 110 and receiver unit, or detection unit, 170 are coupled to processor unit 108 via communication media 132(*a*) and 132(*b*), respectively, which are used to provide image data to processing unit 108. Communication media 132 (generally) are, for example, a USB bus, IEEE bus, or other wired bi-directional communication medium.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device(s), wireless processing device, personal computer (PC), desktop, notebook, and the like. The processing device typically includes processing and storage modules.

The image display unit 114 is coupled to processor unit 108 via bidirectional communication medium 136, which is typically a bus or wired connection. The display unit 114 is used to display the image data generated by the system 100. The display unit 114 may be, for example, a monitor, liquid crystal display (LCD), a plasma screen, a graphical user interface (GUI), or other module adapted to display output data typically by a representation of pixels. Input module 118 is coupled to processing unit 108 via bidirectional communication medium 134, which is typically a bus or wired connection. The input module 118 may include devices such as a keyboard, mouse, track ball, and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) to adjust the view, dimensions, color, font, or display characteristics. The processing module 108 may also be coupled to a printer (not shown) to print the output, or a transmission module, such as a DSL line (not shown), or a modem, such as a wireless modem (not shown), to transmit the output to a second location or another display module. This transmission may also be accomplished using a network, such as the Internet, with web browsing capability, or other network of operatively coupled computers, processors, or output devices.

The network 120 is, for example, any combination of linked computers, or processing devices, adapted to transfer (transmit and/or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively, the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Additionally, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers. The network 120 is coupled to processing device 108 via wired or wireless bi-directional communication medium 102.

Memory module 122 is an electronic storage medium, such as a server, or other electronic storage repository that can store data used by system 100. The memory module 122 may include, for example, RAM, ROM, EEPROM, or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bi-directional communication medium 112.

Among the volume-rendering techniques, ray-casting can generate the highest quality images and the algorithms scale well with the increase of the dataset size, so it will be used as an example in this application. In ray-casting for volume rendering, a color and an opacity is assigned to each voxel, and a 2-D projection of the resulting colored semi-transparent gel is computed. Methods of ray-casting for volume rendering are described in detail in Marc Levoy (1988), "Display of surfaces from volume data," *IEEE Computer Graphics and Applications,* 8(5):29-37, the entirety of which is incorporated by reference herein. Ray-casting is also described in Marc Levoy (1990), "Efficient ray tracing of volume data," *ACM Transactions on Graphics,* 9(3): 245-261.

Ray casting is a process that, for each pixel in an image volume to be rendered, casts a single ray from the eye through the center of the pixel and into the volume, integrating optical properties, such as color and opacity, obtained from the encountered volume densities along the ray path. Two modes of ray casting are direct volume rendering (DVR) and shaded surface display (SSD). In many imaging modalities, such as CT or MRI, the resulting intensity values or ranges of values can be correlated with specific types of tissue, enabling one to discriminate, for example, bone, muscle, flesh, fat tissue, nerve fibers, blood vessels, organ walls, etc., based on the intensity ranges within the image. The raw intensity values in the image can serve as input to a transfer function (often in the form of a look-up table) whose output is an opacity or color value that can characterize the type of tissue. These opacity values can be used to define a look-up table where an opacity value that characterizes a particular type of tissue is associated with each pixel point. The optical properties being integrated by a ray can be obtained for a pixel from the look-up table. The use of opacity values to classify tissue enables a user to select an object or tissue type to be displayed and only integrate opacity values corresponding to the selected object or tissue.

Space leaping and early ray termination can be used to speed up ray-cast volume rendering. Both of these techniques use the opacity values of the transfer function as an indicator. Space leaping is a technique which skips through without sampling regions whose opacity is 0, meaning totally transparent. Early ray termination stops accumulating (compositing), and therefore stops sampling, the volume when the accumulated opacity reaches a certain value, say 1.0 (completely opaque). However, depending on the transfer function, these methods may not be always effective. For example, if a transfer function is very translucent for many regions, the space leaping optimization may not be effective since the regions are not completely transparent. Early ray termination may not be effective due to slow opacity accumulation.

The optimal sampling rate is also dependent on spatial frequency or regional data, color, and/or alpha variations. Wood grain is an artifact caused by aliasing or low sampling rate. To avoid aliasing, the sampling rate should be at least twice the highest spatial frequency (Nyquist Theorem). The higher the regional variations, the higher the sampling rate should be. However, by keeping a uniformly high sampling rate everywhere, including very translucent regions, is inefficient, since then the algorithm must perform many memory accesses, tri-linear interpolations, and compositing. As a result, the performance of the ray-casting technique may be low and the interactivity is poor.

The compositing operation, also known as the "over" operator, is shown in equation (1) below. The contribution of a sample is weighted by its regional opacity value $\alpha_k$ as well as the accumulative opacity $\alpha_{accum}$ over a ray in the image. If $\alpha_k$ is very small, or if $\alpha_{accum}$ is near 1.0, the weight is near zero. Therefore, the sample from a very translucent region contributes little to the final image. That is, high sampling rate in such regions will not substantially improve the rendering quality. Similarly, for regions which have opaque surfaces, meaning regions that have large color/opacity changes and the region is quite opaque, high sampling rate is desired to reduce the artifacts and improve rendering quality. Therefore, the sampling rate may be dynamically changed according to regional color/opacity changes and overall region translucency. This can help improve the performance without visually degrading the rendering quality.

$$C_{accum} = C_{accum} + C_k \alpha_k (1 - \alpha_{accum})$$

$$\alpha_{accum} = \alpha_{accum} + (1 - \alpha_{accum}) \alpha_k \quad (1)$$

Accordingly, one embodiment of the present invention is a method that dynamically changes the sampling rate according to regional data, color, and/or alpha variations (spatial frequency), regional and accumulative opacities, and quality settings. Equation (2) describes how the sampling rate (SR) of an octree node along each ray is determined by these factors.

$$SR = A(v) \times B(1 - \alpha_{accum}) \times C(\alpha_{diffsum}) \times D(q) \quad (2)$$

In equation (2), A(v) is a function of regional variation v, which may be data, color, and/or alpha variation of the octree node. $\alpha_{diffsum}$ is a regional opacity measure that will be discussed later in relation to equation (4). $C(\alpha_{diffsum})$ is a function of regional opacity $\alpha_{diffsum}$. And, D(q) is a function of quality setting q. D(q) may also be viewed as a default sampling rate, and thus default image quality, defined by the application. The weighing functions A, B, C, and D in equation (2) may be used to modulate the regional variance, the accumulated opacity, the regional translucency, and the quality to emphasize the importance of one factor over another. These functions may be experimentally determined by, for example, modifying the ratios of the functions and measuring the effect on image quality. These functions may be thought of as simple identity functions. However, this example of the weighing functions A, B, C, and D is illustrative only and is not to limit the scope of the present invention. The weighing functions may be any arbitrary, linear or non-linear, functions of their respective parameters.

From equation (2), it is evident that if the regional color/alpha variance is large, sampling the node more densely will improve image quality. Similarly, if the node is more opaque, sampling the node more densely will also improve image quality. On the other hand, if the accumulated $\alpha_{accum}$ is near 1.0 (nearly completely opaque), sampling the node more coarsely will improve rendering time without sacrificing image quality. Both early ray termination and space leaping are already built into equation (2). For example, the early ray termination criteria is reached when $\alpha_{accum}$ equals 1.0, and the sampling rate (SR) according to equation (2) is 0. Similarly, the space leaping criteria is reached when $\alpha_{diffsum}$ equals 0, meaning that the octree node is totally transparent, and the sampling rate (SR) according to equation (2) is also 0.

Figure 2:
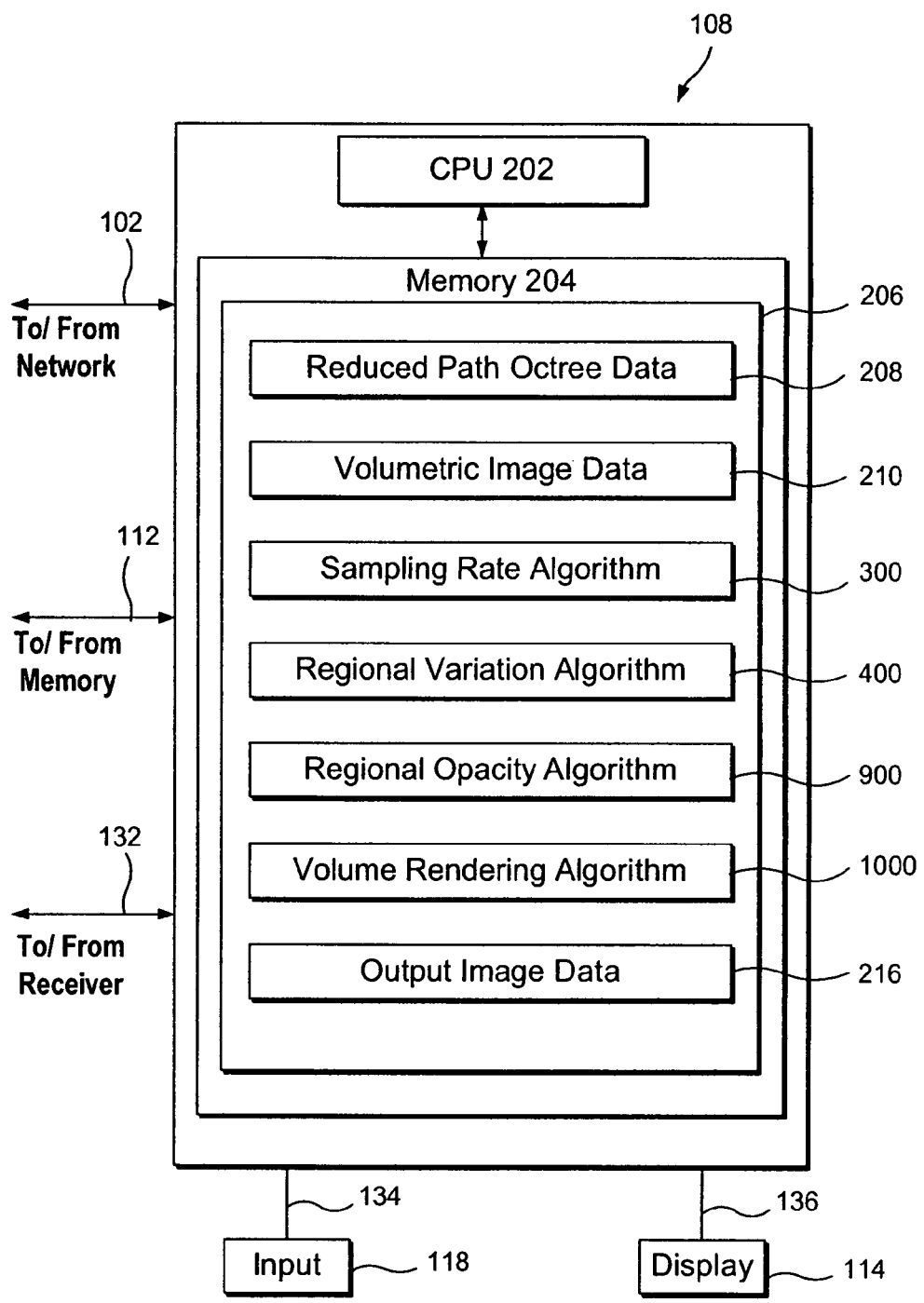
FIG. 2 illustrates a processing apparatus that may be used with the present invention.

FIG. 2 illustrates a processor module 108 that may be used with the present invention. Processor module 108 includes a CPU 202 and memory 204. Also shown in FIG. 2 are the bi-directional communication media 102, 112, and 132. Display module 114 and input module 118 and communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary.

Memory module 204 is typically an electronic storage medium such as RAM, ROM, EEPROM, or other memory device, such as an optical disk, optical tape, CD, or a floppy disk, a hard disk, flash drive, or a removable cartridge, which may be inserted into a port (e.g., a USB port) or interconnector, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores data 206, which include, for example, a reduced path octree data structure memory module 208, volumetric image data storage module 210, sampling rate calculation algorithm module 300, regional variation calculation algorithm storage module 400, regional opacity algorithm module 900, volume rendering algorithm storage module 1000, and output image data storage module 216, as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such as way that the contents of the memory are provided to the CPU 202 and/or system controller 108. Once the data has been accessed, typically by program code to fetch, or retrieve, the desired data stored in memory, it may be processed according to one or more algorithms described here.

Figure 3:
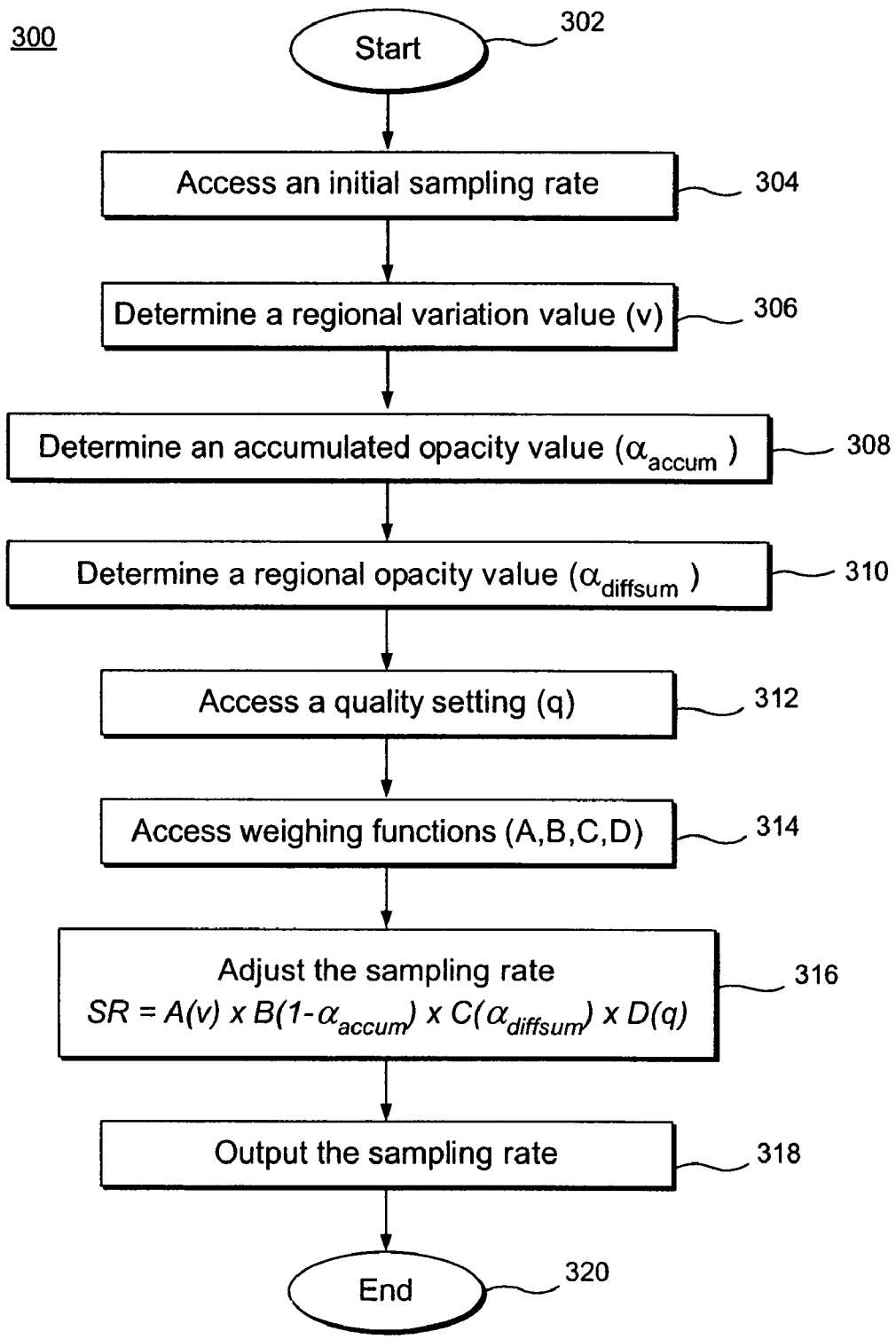
FIG. 3 shows a flowchart for adjusting a sampling rate for rendering an image.

By using the sampling rate (SR) defined in equation (2), an embodiment of the present invention allows for faster volume rendering. Accordingly, one embodiment of the present invention, illustrated in FIG. 3, is directed to a system and a method of determining a sampling rate for volume rendering. FIG. 3 shows a process 300, which is for example, a series of steps, or program code, or algorithm stored on an electronic memory or computer-readable medium, used to determine, select, calculate, and/or adjust the sampling rate. The steps 300 may be executed by a processor, or otherwise executed to perform the identified functions and may also be stored in one or more memories. For example, the steps of FIG. 3 may be stored on a computer-readable medium, such as ROM, RAM, EEPROM, CD, DVD, or other non-volatile memory. The process 300 begins in step 302. An initial sampling rate is accessed from memory, as shown in step 304. A regional variation value (v) is determined, as shown in step 306. An accumulated opacity value is determined ($\alpha_{accum}$) as shown in step 308. A regional opacity value ($\alpha_{diffsum}$) is determined, as shown in step 310. A quality setting (q) is accessed from memory, as shown in step 312. Weighing functions A, B, C, and D are accessed from memory, as shown in step 314. The sampling rate is adjusted according to equation (2), as shown in step 316. The adjusted sampling rate is output, as shown in step 318. The process 300 ends at step 320.

The accumulated opacity ($\alpha_{accum}$) calculated in step 308 may be obtained using equation (1); that is, by accumulating the opacity over a ray by using the "over" operator. The quality setting (q), accessed in step 312 of FIG. 3, is defined by the application and/or selected by the operator to adjust image quality. The process to generate the regional variation value (v), step 306, is described in detail in relation to FIGS. 4-8 below. The process to generate the regional opacity value ($\alpha_{diffsum}$), step 310 of FIG. 3, is described in detail in relation to FIG. 9 below. The entire process of rendering a volumetric image is described in detail in relation to FIG. 10 below.

As stated above, in equation (2), the accumulated opacity ($\alpha_{accum}$) may be obtained using equation (1); that is, by accumulating the opacity over a ray by using the "over" operator. The quality setting (q) is defined by the application and/or selected by the operator to adjust image quality. Further discussion will concentrate on methods to determine the regional color/alpha variation (v) and the regional opacity of an octree node ($\alpha_{diffsum}$).

In order to calculate the regional color/opacity variation and the regional opacity, the reduced path octree data structure may be used. As mentioned above, the reduced path octree data structure is described in U.S. application Ser. No. 11/158,879 to Yang et al., the entirety of which is incorporated by reference. The following discussion will assume a 2-level reduced path octree (that is, a 4×4×4 node and a 16×16×16 node). The sampling rate will be set based on the rate of color/opacity variation within an octree node. The regional variation may be calculated by computing the 3-dimensional gradients of R, G, B, and A (Red, Green, Blue, and Alpha) components (also called channels) for each voxel inside the octree. The changes in each channel for all the voxels are then combined to yield a single value (for example, by finding the maximum of the color gradients). This example is illustrative only, and the present invention is not limited to the RGBA color model, and any other color model, such as YIQ, may also be calculated in the same way as the RGBA model. A YIQ model may be used to capture perceptual differences. For illustration purposes only, the following discussion will focus only on the RGBA color model.

The regional color/alpha variations may be theoretically computed by using equation (3a).

$$\frac{\partial C}{\partial S} = F'(d) \frac{\partial d}{\partial S} \qquad (3a)$$

where C=(R, G, B, A) is the collection of color channels, S=(x, y, z) is the sampling position, F is the transfer function, d is the gray scale value, and $$\frac{\partial d}{\partial S}$$

is the gradient of the gray scale value at the sampling point S.

Figure 4:
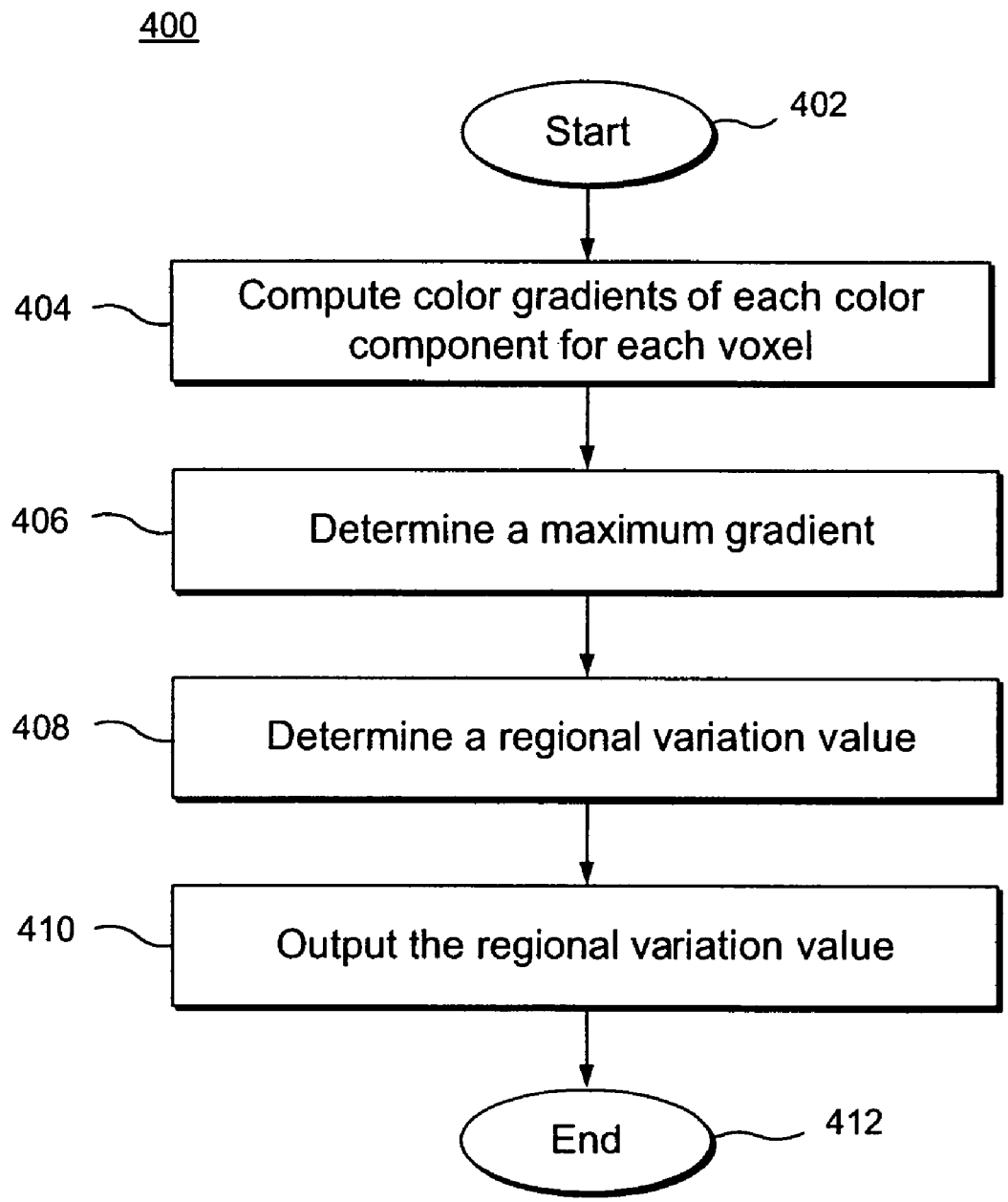
FIG. 4 shows a flowchart for one embodiment for determining a regional variation.

Accordingly, FIG. 4 illustrates another embodiment of the present invention, directed to a system and a method of determining the regional variation by utilizing regional color gradients according to equation (3a). FIG. 4 shows a process 400, which is for example, a series of steps, or program code, or algorithm stored on an electronic memory or computer-readable medium. For example, the steps of FIG. 4 may be stored on a computer-readable medium, such as ROM, RAM, EEPROM, CD, DVD, or other non-volatile memory. The algorithm may be used to generate the regional variation value, which is later accessed in step 306 of process 300 shown in FIG. 3. The process may also be a module that includes an electronic memory, with program code stored thereon to perform the functionality. This memory is a structural article. Process 400 begins in step 402. Color gradients of each color component for each voxel are computed, as shown in step 404. A maximum gradient is determined from the color gradients, as shown in step 406. A regional variation value is computed from the maximum gradient, as shown in step 408. The regional variation value is output for use in process 300, as shown in step 410. The process 400 ends in step 412.

To simplify the calculation of equation (3a), the approximation of equation (3b) may be used.

$$\frac{\partial C}{\partial S} \approx \frac{F(d_1)|_{s=s1} - F(d_2)|_{s=s2}}{\nabla(d)} \frac{\nabla(d)}{\nabla(s)} \qquad (3b)$$
$$\approx \frac{F(d_1) - F(d_2)}{\text{sampling\_distance}}$$

where $s_1$ and $s_2$ are two adjacent samples positions, $s_1-s_2$ is the sampling distance, and $d_1$ and $d_2$ are the sample values at positions $s_1$ and $s_2$, respectively.

According to equation (3b), in order to determine the color variation, it is necessary to sample at $s_1$ and $s_2$. It is beneficial to avoid such sampling due to high memory accessing and processing overheads. Accordingly, an approximation of the regional variation may be used to improve performance. Therefore, in an octree node, replace $F(d_1)-F(d_2)$ with $[\max(F(d))-\min(F(d))]_{d\in(d_{min},d_{max})}$, where $d_{min}$ and $d_{max}$ are minimal and maximal data values, respectively, in the octree node that are pre-stored during octree creation. This approximation is essentially a conservative one, which will make the calculated maximal color/alpha variation larger than the actual color/alpha variation inside the node, and therefore the sampling rate will be higher than that actually required to assure optimal rendering quality.

Figure 5:
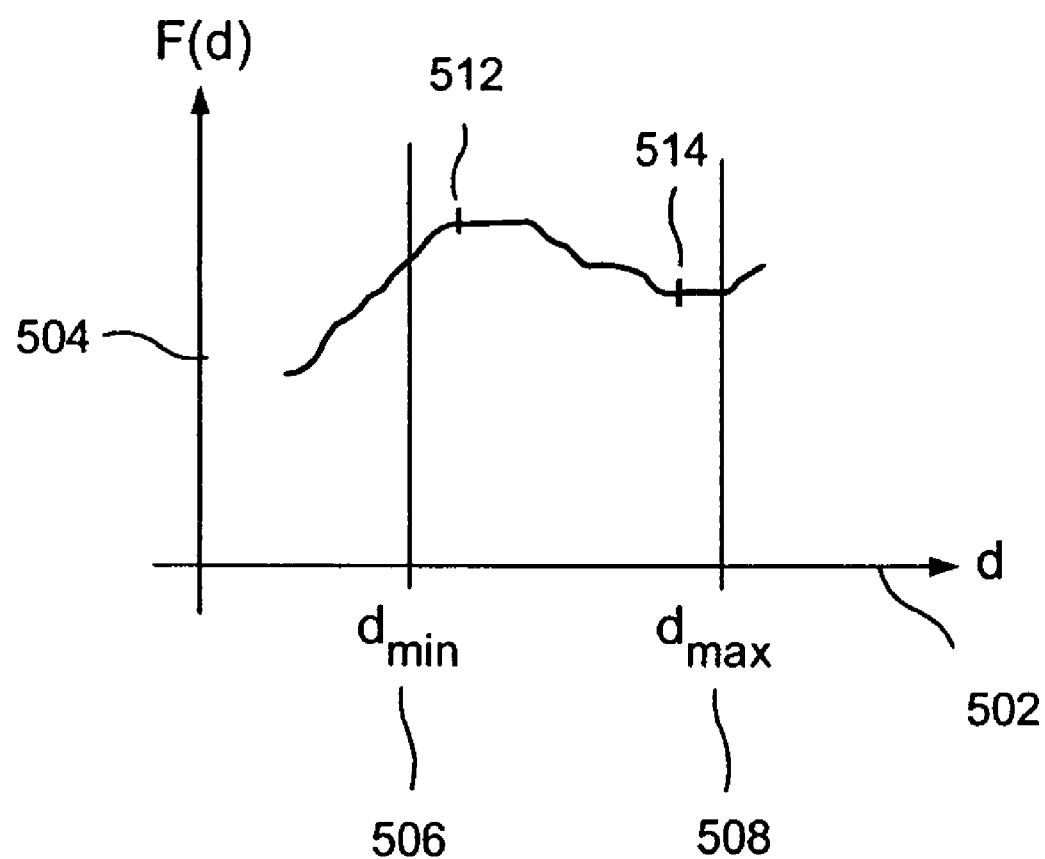
FIG. 5 illustrates a technique to approximate the regional variation.

The above approximation is illustrated in FIG. 5 as shown by graph 500. The x-axis 502 represent data values d from the octree, while the y-axis 504 is the value of the transfer function F(d). The minimum data value 506 ($d_{min}$) and the maximum data value 508 ($d_{max}$) are shown. The maximum transfer function value 512 [max F(d)] and the minimum transfer function value 514 [min F(d)] are also shown. The approximation described above is conservative; that is, it overestimates the maximum regional variation inside the node.

Figure 6:
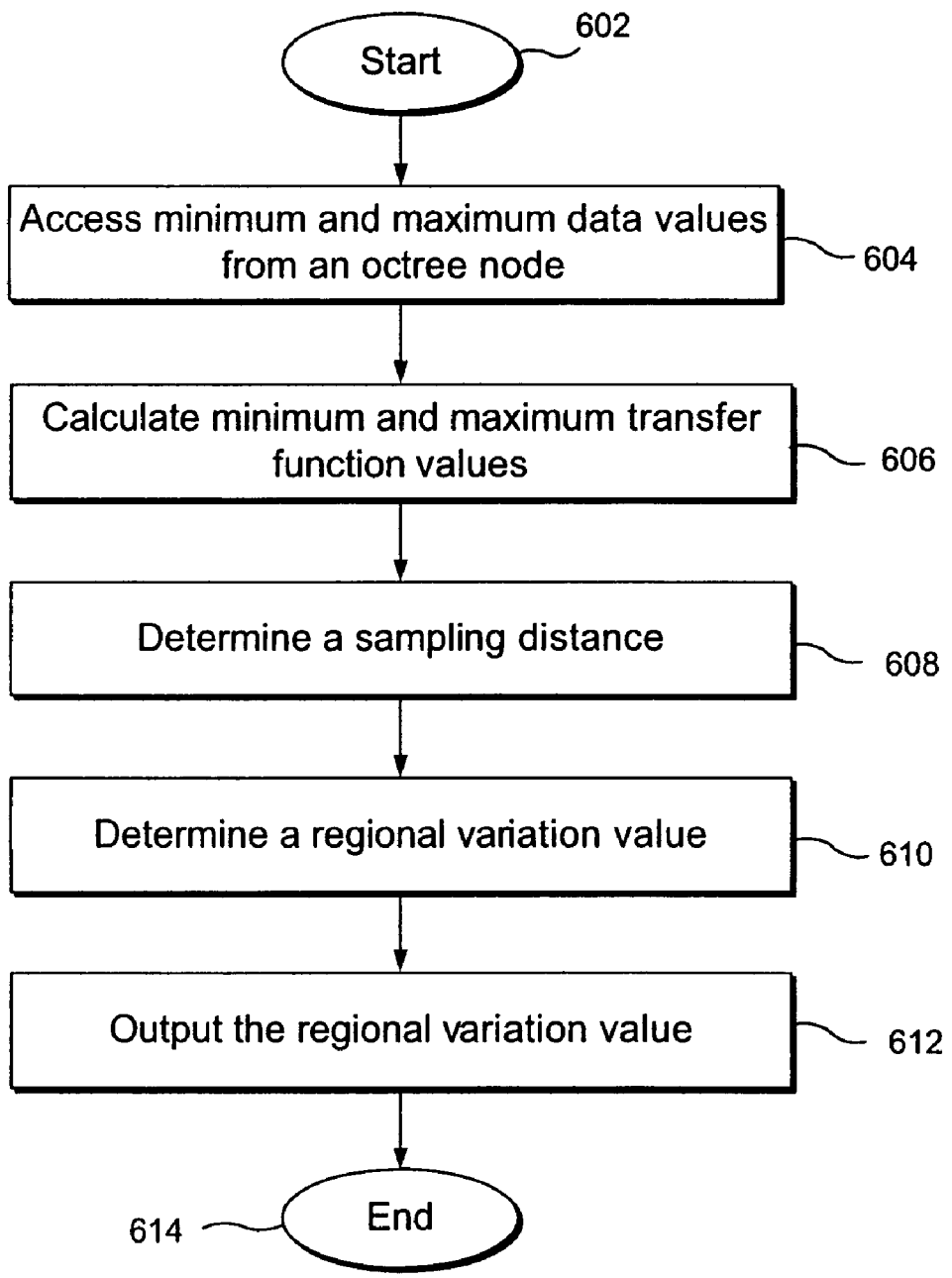
FIG. 6 shows a flowchart for another embodiment for estimating the regional variation.

Accordingly, FIG. 6 illustrates another embodiment of the present invention, directed to a system and a method of estimating the regional variation by utilizing the approximation of equation (3b). FIG. 6 shows a process 600, which is for example, a series of steps, or program code, or algorithm stored on an electronic memory or computer-readable medium, used to generate the regional variation used in step 306 of process 300 shown in FIG. 3. The process 600 may also be a module that includes an electronic memory, with program code stored thereon to perform the functionality. This memory is a structural article. Process 600 begins in step 602. Minimum and maximum data values are accessed from an octree node, as shown in step 604. Minimum and maximum transfer function values are calculated from the minimum and maximum data values, as shown in step 606. A sampling distance is determined from the sampling positions, as shown in step 608. A regional variation value is determined from the minimum and maximum transfer function values and the sampling distance, as shown in step 610. The regional variation value is output for use in process 300, as shown in step 612. Process 600 ends as shown in step 614.

To further reduce the run-time computation, a pre-calculated maximum color/alpha variations table Var[min][max] may be generated during pre-processing. Each element of the table Var[min][max] is the maximum variation among the R, G, B, and A channels between the two table indices a and b.

The variation table needs to be recomputed every time that the transfer function changes. In a real clinical work flow, the physician might want to see the instant rendering result while changing the transfer function. To speed up the calculation of Var[a][b], an iterative method may be used to compute every table entry. Assumine that $R[a][b]_{max}$, $R[a][b]_{min}$, $G[a][b]_{max}$, $G[a][b]_{min}$, $B[a][b]_{max}$, $B[a][b]_{min}$, $A[a][b]_{max}$, $A[a][b]_{min}$ have been computed. From them, it is possible to determine $R[a+1][b]_{max}$, $R[a+1][b]_{min}$, etc. by taking the $\max(R[a][b]_{max}, \text{Lut}_{Rmax}[\alpha+1])$ as $R[a+1][b]_{max}$ and $\min(R[a][b]_{min}, \text{Lut}_{Rmin}[\alpha+1])$ as $R[a+1][b]_{min}$, etc. The same step is used for all of the other channels. Similarly, $R[a][b+1]_{max}$, $R[a][b+1]_{min}$, etc. may be determined fairly inexpensively. The above steps are repeated iteratively for all a, b indices that satisfy b≧a. Since max is always greater than or equal to min, only the indices of b greater than or equal to a need to be computed.

Figure 7:
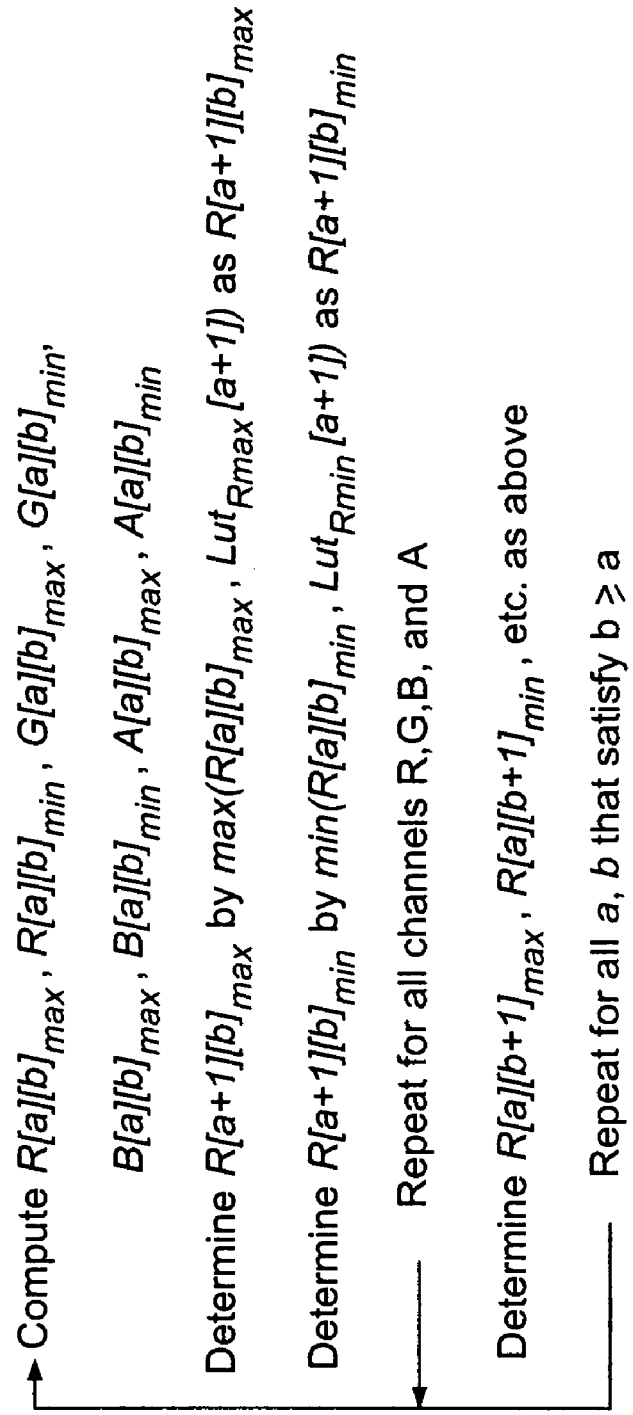
FIG. 7 shows an example of pseudo-code for generating a maximum regional variation table.

FIG. 7 shows sample pseudo-code 700 for generating the maximum regional variation table. This sample pseudo-code is illustrative of but one manner in which the present invention may be implemented, and is not intended to limit the scope or spirit of the present invention. This program code may be stored in memory module 204, as shown in FIG. 2.

The size and computation of table Var[min][max] may be further reduced. First, an approximation is made by quantizing the transfer function lookup tables. This reduces the color/alpha lookup tables' size and makes the lookup tables more manageable. For example, assume the lookup tables have 4096 entries for each of the RGBA channels. Every 16 entries may be grouped. This will reduce the lookup table to 256 entries for each channel. Each entry has only two elements—the minimum and the maximum value among 16 entries as quantized. Therefore, the quantized color/alpha lookup table consists of a maximum quantized color/alpha lookup table and a minimum quantized color/alpha lookup table. These tables are called $\text{Lut}_{Rmax}$, $\text{Lut}_{Rmin}$, $\text{Lut}_{Gmax}$, $\text{Lut}_{Gmin}$, $\text{Lut}_{Bmax}$, $Lut_{Bmin}$, $Lut_{Amax}$, and $Lut_{Amin}$, respectively. This approximation is only used to capture the color/alpha variation for the octree node for the purpose of finding the appropriate sampling rate. The original, full-sized lookup table is used for compositing during run-time.

Another approach, called histogram equalized approximation, is based on the observation that the histogram of the volume is not equally distributed. Therefore, equally quantized levels do not have to be used everywhere along the histogram. A histogram equalization method may be used so that each quantized level has same number of value distribution. This leads to a quantized table where the more populated histogram area gets more finely quantized levels, which can yield more accurate quantization results.

Another quantization method may be used which is based on the fact that the transfer functions are only defined on a limited range of scalar values. Therefore, only the existing number of levels need to be used to quantize only the limited range. For example, the transfer functions may be only defined in the scalar range of 1180 to 2000. Therefore, it is possible to quantize this limited region using 256 levels to quantize between 1024 and 2048. This means grouping every 4 entries and taking the minimum and the maximum as the quantized value. This is more accurate compared to quantizing the entire histogram equally.

The following example shows how to construct one element of this table. Assume that the goal is to construct the table element Var[25][63]. First, find $R_{max}$[25][63] from the quantized R maximum lookup table $Lut_{Rmax}$ as shown in equation (4a).

$$R_{max}[25][63] = \max(Lut_{Rmax}[25], Lut_{Rmax}[26], \ldots, Lut_{Rmax}[63]) \quad (4a)$$

Next, find the minimum $R_{min}$[25][63] from the quantized R minimum lookup table $Lut_{Rmin}$ as shown in equation (4b).

$$R_{min}[25][63] = \min(Lut_{Rmin}[25], Lut_{Rmin}[26], \ldots, Lut_{Rmin}[63]) \quad (4b)$$

Therefore, the normalized R variation ($V_r$) may be calculated using equation (4c).

$$V_r = (R_{max}[25][63] - R_{min}[25][63])/R_{range} \quad (4c)$$

where $R_{range}$ is the dynamic range of the red color channel. The normalization will allow comparison between channels. Then, repeat the same steps for each channel to obtain $V_r$, $V_g$, $V_b$, and $V_a$. Finally, compare and find the maximum among all four channels. The result is the maximal color/alpha variation Var[25][63].

The minimum and the maximum values for each octree node are pre-calculated and stored during the loading of the volume. Accordingly, the minimum and the maximum values may be used to lookup the maximum regional variation table Var[min][max] to get the maximum color/alpha variation inside the node. Since the color/alpha channel has been quantized, the minimum and the maximum values should be quantized in the same way. This may be achieved by right shifting the minimum and the maximum values by 4 bits in the above example.

Figure 8:
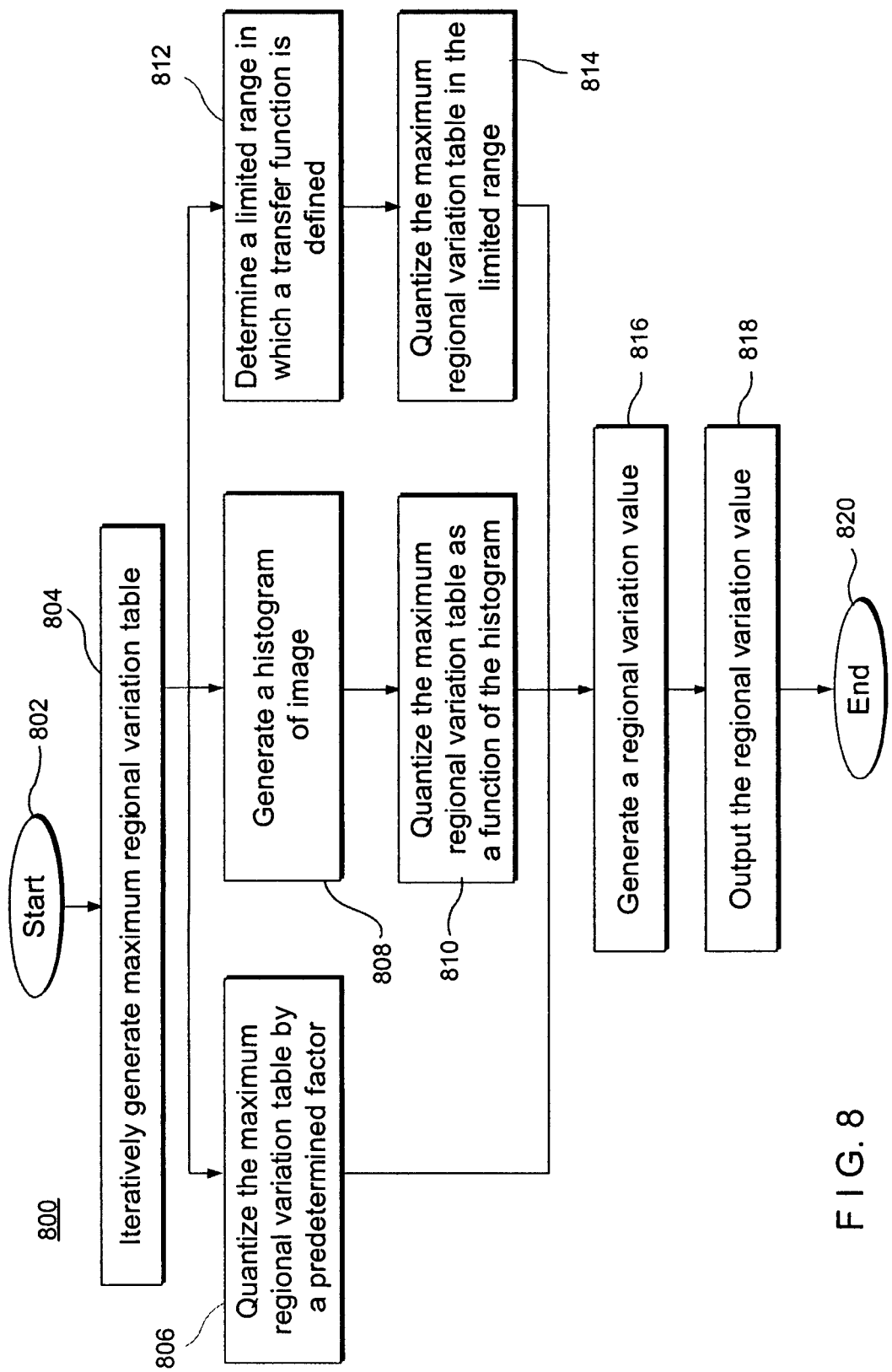
FIG. 8 shows a flowchart for yet another embodiment for estimating the regional variation.

Accordingly, FIG. 8 illustrates yet another embodiment of the present invention, directed to a system and a method of efficiently estimating the regional variation. FIG. 8 shows a process 800, which is for example, a series of steps, or program code, or algorithm stored on an electronic memory or computer-readable medium, which may be used to efficiently generate the regional variation value before it is accessed in step 306 of process 300 shown in FIG. 3. The process may also be a module that includes an electronic memory, with program code stored thereon to perform the functionality. This memory is a structural article. Process 800 begins in step 802. In step 804, the maximum regional variation table is generated iteratively as described above in relation to FIG. 7. Then, the algorithm 800 may either quantize the maximum regional variation table equally (step 806) or by using histogram equalization (steps 808 and 810). In step 806, the maximum regional variation table is quantized by a predetermined factor. Alternatively, a histogram of the input image may be generated, as shown in step 808, and then quantizing the maximum regional variation table as a function of the histogram, as shown in step 810, so that each quantized level has same number of value distribution. As an alternative optimization technique, a limited range may be determined in which the transfer function is defined, as shown in step 812, and the maximum regional variation table may be quantized only within that limited range, as shown in step 814. These techniques may be used separately or in appropriate combinations, as will be appreciated by one of ordinary skill in the art. The regional variation value is generated, as shown in step 816. The regional variation value is output for use in process 300, as shown in step 818. The process 800 ends in step 820.

The preceding discussion covers methods to calculate the regional variation (v). In order to calculate the overall translucency (regional opacity value, $\alpha_{diffsum}$) of an octree node, the same process may be used as computing whether an octree node is empty or not. For that purpose, an alpha summed area table may be used, as described in Yang et al. (U.S. Ser. No. 11/158,879). The octree structure used to determine which nodes are empty depends on the transfer function. Thus, changing the transfer function requires the octree data structure to be recomputed, which can introduce a noticeable delay during run-time. Accordingly, to shorten this delay, a min-max structure can be incorporated into the octree structure. Instead of storing whether or not a node is empty, the minimum and maximum value of all the voxels contained within a node is stored. This data structure can be constructed the first time an image volume is loaded, and need not be updated when the transfer function changes. Therefore, a min-max structure may be used during volume rendering to determine the "emptiness" of a node during run-time when used with the alpha summed area table. Equation (5) defines how to construct an alpha summed area table for each entry, where lut[i].alpha represents the lookup table opacity value for the $i^{th}$ voxel.

$$lutsum[n] = \sum_{i=0}^{n} (lut[i].alpha \neq 0) \quad (5)$$

The regional opacity $\alpha_{diffsum}$ of a node may be determined by subtracting the table entry of the maximum value and the table entry of the minimum value. Thus, the expression "lutsum[max]−lutsum[min]" as illustrated in equation (6), may be used to determine how translucent a node is; that is, its regional opacity $\alpha_{diffsum}$. If the table entries have the same value, the node is said to be empty, as are all voxels contained within this node, and therefore the node is completely translucent ($\alpha_{diffsum}=0$). The maximum variation table Var[a][b] and the regional opacity $\alpha_{diffsum}$ need to be re-computed every time the transfer function changes. The maximum variation table Var[a][b] needs to be calculated at a pre-processing step, while the regional opacity $\alpha_{diffsum}$ for each octree node may be either filled-in during pre-processing or evaluated during run-time.

Equation (6) illustrates an example of determining the regional opacity $\alpha_{\text{diffsum}}$.

$$\alpha_{\text{diffsum}} = \text{lutsum}[530] - \text{lutsum}[15] \qquad (6)$$

In the example of equation (6), the minimum and the maximum values of the octree node are 15 and 530, respectively. Compared to the original volume data and the reduced path octree data structure, the alpha summed area table is small in size and easy to compute. For example, a typical alpha summed area table for 16×16×16 nodes has only 4096 entries. Since the calculation of the table as shown in equation (5) is incremental, the update of the table is very fast. Thus, each time the transfer function changes, only the alpha summed area table needs to be updated, instead of reconstructing the reduced path octree. The update of the table can be performed in milliseconds and is not noticeable to an end user.

Figure 9:
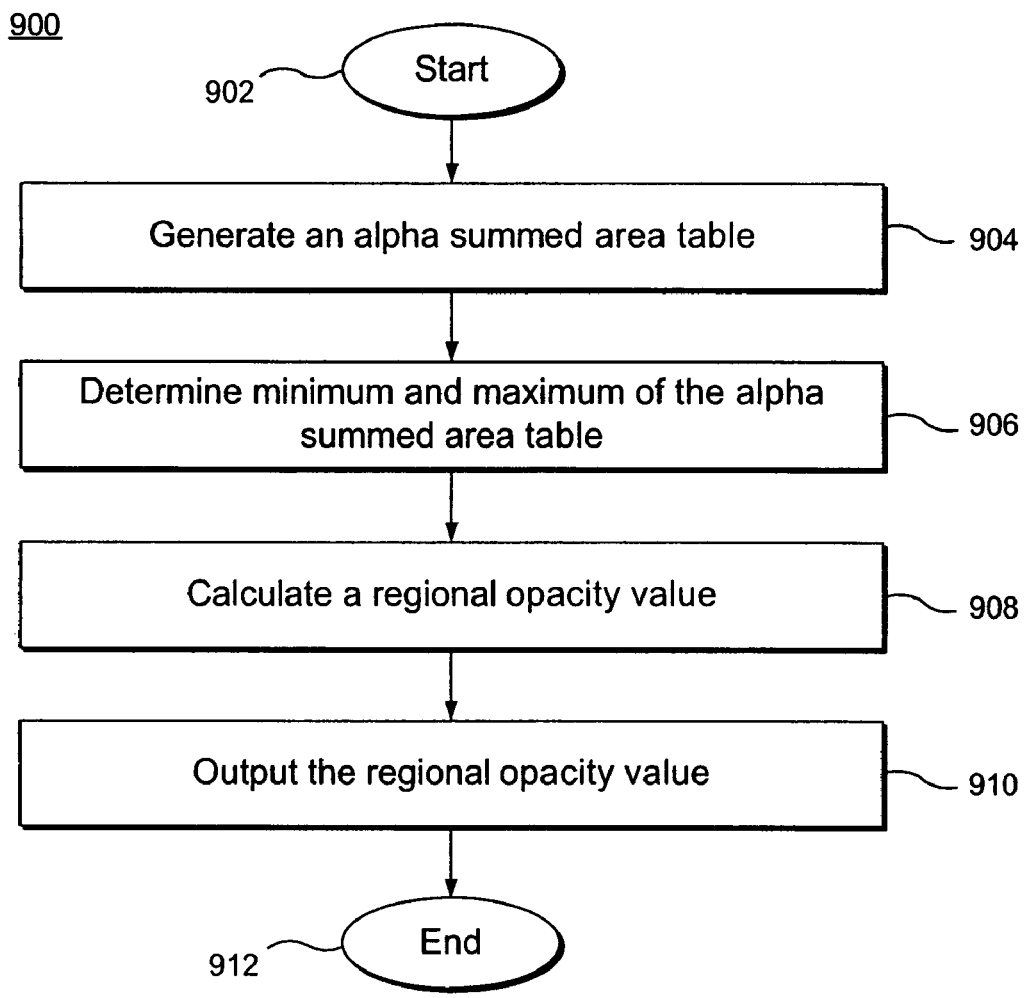
FIG. 9 shows a flowchart for determining a regional opacity.

Accordingly, FIG. 9 illustrates another embodiment of the present invention, directed to a system and method of determining the regional opacity value. FIG. 9 shows a process 900, which is for example, a series of steps, or program code, or algorithm stored on an electronic memory or computer-readable medium, which may be used to generate the regional opacity value before it is accessed in step 310 of process 300 shown in FIG. 3. The process may also be a module that includes an electronic memory, with program code stored thereon to perform the functionality. This memory is a structural article. Process 900 begins in step 902. An alpha summed area table is generated as described above, as shown in step 904. The minimum and the maximum of the alpha summed area table is calculated, as shown in step 906. A regional opacity value is determined from the minimum and the maximum of the alpha summed area table, as shown in step 908. The regional opacity value is output for use in process 300, as shown in step 910. The process 900 ends in step 912.

With all of the elements in equation (2) calculated, the sampling rate may be determined for each octree node. One method is to define a lookup table for each sampling rate from 0.1, 0.2, ..., 1, 2, ... 20. Then to divide the sampling rate calculated using equation (2) into 30 value ranges, where each range maps to one sampling rate. Therefore, it is efficient to determine the sampling rate for each octree node. Alpha correction is required because different sampling rates are used along each ray. Equation (7) shows how to calculate the correct alpha value using alpha correction.

$$\alpha_{\text{actual}} = 1 - \alpha_{\text{input}} \times (1 - \alpha_{\text{input}})^{\frac{1}{\text{sampRate}}} \qquad (7)$$

By dynamically changing the sampling rate along the viewing direction according to regional data/color/alpha changes, regional and accumulated translucency/opacity, and quality settings, the performance of volume rendering may be vastly improved without degrading the rendered visual image quality for those transfer functions for which space leaping and early ray termination are not effective.

Figure 10:
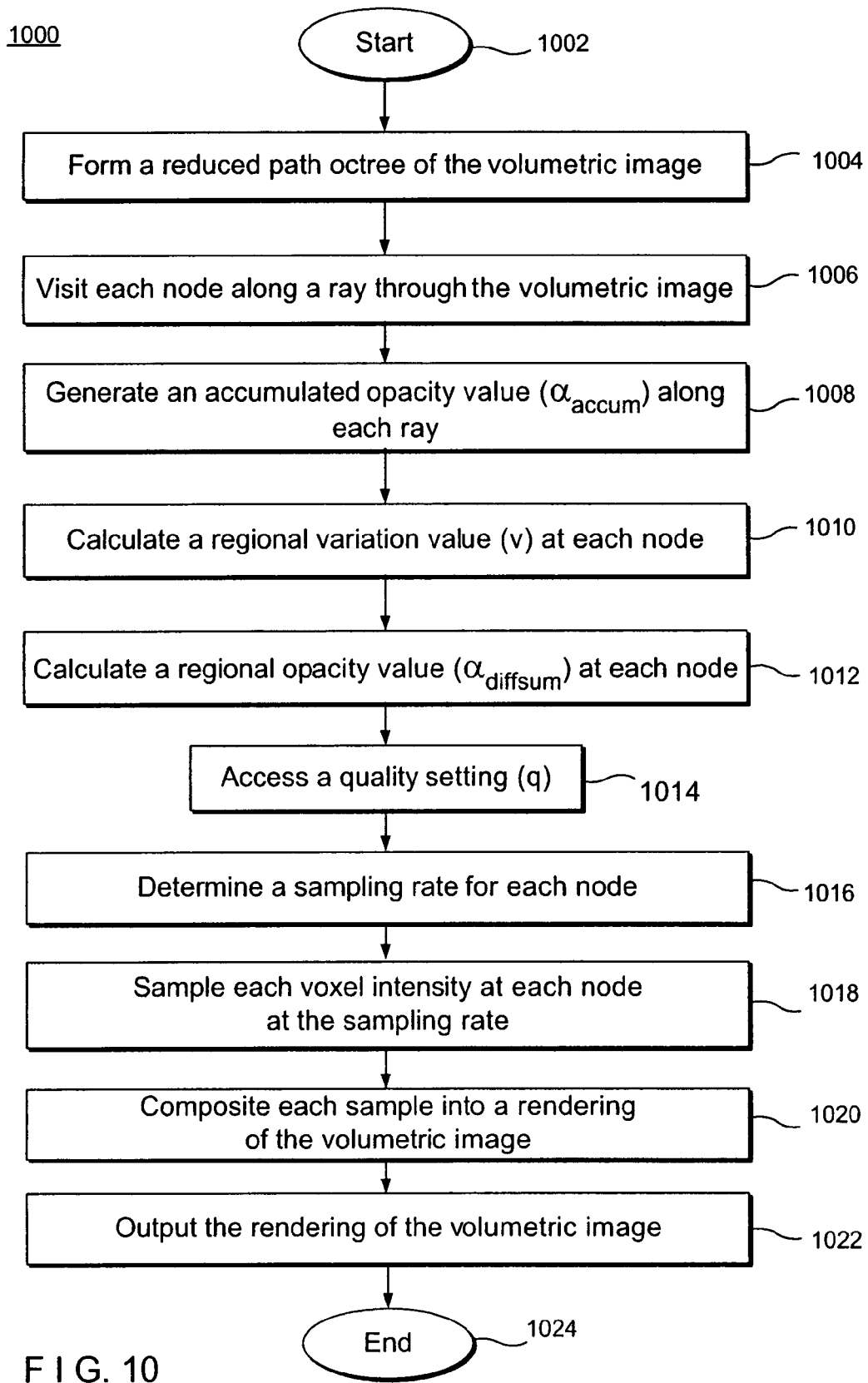
FIG. 10 shows a flowchart for rendering a volumetric image.

Accordingly, FIG. 10 illustrates another embodiment of the present invention, directed to a system and method of rendering a volumetric image. FIG. 10 shows a process 1000, which is for example, a series of steps, or program code, or algorithm stored on an electronic memory or computer-readable medium, which may be used to render a volumetric image. The process may also be a module that includes an electronic memory, with program code stored thereon to perform the functionality. This memory is a structural article. Process 1000 begins in step 1002. A reduced path octree of the volumetric image is generated, as shown in step 1004. Each node along a ray through the volumetric image is visited, as shown in step 1006. While visiting each node, an accumulated opacity value ($\alpha_{\text{accum}}$) is calculated along each ray using equation (1), as shown in step 1008. A regional variation value (v) is calculated for each node using one of the method described above, as shown in step 1010. A regional opacity value ($\alpha_{\text{diffsum}}$) is calculated for each node using the method described above, as shown in step 1012. A quality setting (q), representing a default sampling rate and thus default image quality, is accessed from memory, as shown in step 1014. A sampling rate for each node is determined, as shown in step 1016. Each voxel's intensity is sampled at each node along each ray using the sampling rate, as shown in step 1018. Each sample is composited into a rendering of the volumetric image, as shown in step 1020. Finally, a rendering of the volumetric image (a 2D image) is output, as shown in step 1022. The outputted rendering may be displayed on a display (shown in FIG. 1 as element 114), and/or transmitted over a network (shown in FIG. 1 as element 120), and/or stored in memory. Any other further processing, display, or printing steps may be performed, as would be clear to one of ordinary skill in the art after obtaining the outputted rendering in step 1022. The process ends in step 1024. The process to generate the regional variation value (v) was described in detail in relation to FIGS. 4-8 above. The process to generate the regional opacity value ($\alpha_{\text{diffsum}}$) was described in detail in relation to FIG. 9 above.

Figure 11:
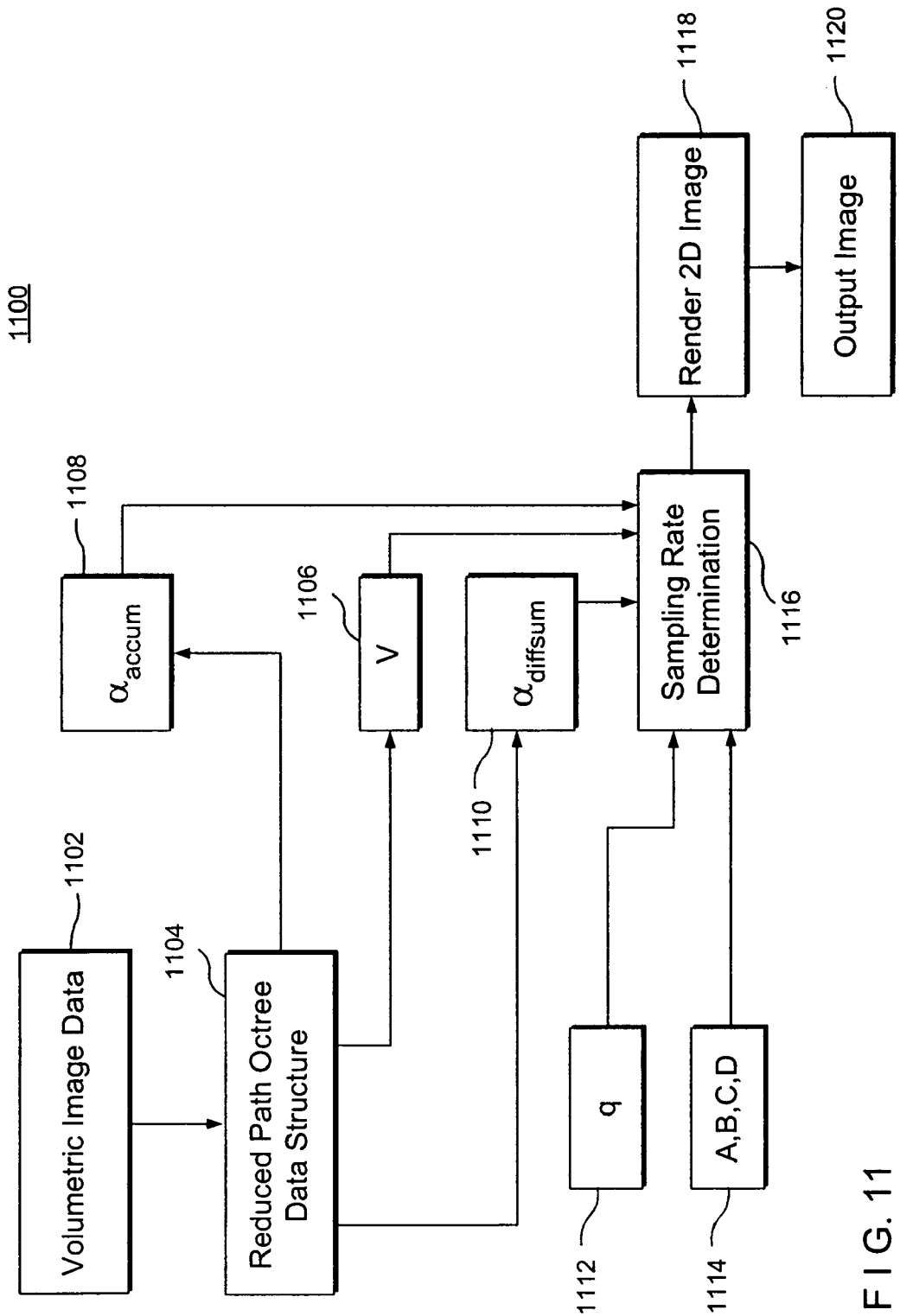
FIG. 11 shows modules, or processing facilities, adapted to perform the described functionality of embodiments of the present invention.

FIG. 11 shows modules, or processing facilities, 1100 adapted to perform the described functionality of the present invention. Volumetric image data is stored in module 1102. The volumetric image data is provided to reduced path octree data structure module 1104, which generates a reduced path octree data structure from the volumetric image data, as described above. Using the reduced path octree data structure, the regional variation value (v) is determined in module 1106, the accumulated opacity value ($\alpha_{\text{accum}}$) is determined in module 1108, and the regional opacity value ($\alpha_{\text{diffsum}}$) is determined in module 1110. The quality setting (q) is accessed from module 1112. The weighing functions (A, B, C, D) are accessed from module 1114. The regional variation value (v), the accumulated opacity value ($\alpha_{\text{accum}}$), the regional opacity value ($\alpha_{\text{diffsum}}$), the quality setting (q), and the weighing functions (A, B, C, D) are used to determine, generate, select, and/or adjust the sampling rate in module 1116. The sampling rate is used in module 1118 to generate and render a 2D image of the input volumetric image. The rendered 2D image is stored in module 1120, for further processing or display.

FIGS. 12A and 12B show a comparison of rendering results in which performance was doubled when using the principles of the present invention (FIG. 12A) as compared to when not using the principles of the present invention (FIG. 12B) without degrading image quality. Both images 12A and 12B were generated using the same quality setting. In this example, the performance was doubled without visual quality degradation, as can be seen by comparing FIGS. 12A and 12B.

FIGS. 13A and 13B show a comparison of rendering results when using the principles of the present invention (FIG. 13A) compared to when not using the principles of the present invention (FIG. 13B) at the same performance resulting in superior image quality. Images 13A and 13B have different quality settings but were generated at the same performance (in the same amount of time). The principles of the present invention result in a higher resolution image with no wood grain artifacts (FIG. 13A) compared with an image generated using conventional techniques (FIG. 13B).

Therefore, by dynamically changing the sampling rate according to regional data, color, and/or alpha variations, regional and accumulative opacities, and quality settings, it is possible to achieve significant performance improvement for translucent transfer functions without visual quality degradation.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method executed by a processor for adjusting a rendering sampling rate of an image, comprising:
    providing an initial sampling rate;
    determining a regional variation value representing regional data, color, and alpha variation;
    determining an accumulated opacity value representing opacity accumulated over a ray in the image;
    determining a regional opacity value representing regional opacity;
    accessing a quality setting representing a default sampling rate obtained from a memory; and
    dynamically adjusting the rendering sampling rate of the image, by adjusting a rate of ray sampling for each voxel, as a function of the regional variation value, the accumulated opacity value, the regional opacity value, and the quality setting, thereby maintaining a predetermined image quality level.

2. A method executed by a processor for rendering an image, comprising:
    forming a reduced path octree of volumetric image having n levels;
    visiting each nth level node along a ray through the volumetric image;
    generating an accumulated opacity value along each ray while visiting each nth level node;
    calculating a regional variation value representing data, color, and alpha variation at each nth level node;
    calculating a regional opacity value representing regional opacity at each nth level node;
    accessing a quality setting representing a default sampling rate obtained from a memory;
    determining a sampling rate for each voxel of nth level node as a function of the regional variation value, the accumulated opacity value, the regional opacity value, and the quality setting;
    sampling each voxel intensity at each nth level node at the sampling rate;
    dynamically adjusting the sampling rate for each voxel, by adjusting a rate of ray sampling for each voxel, as a function of the regional variation value, the accumulated opacity value, the regional opacity value, and the quality setting, thereby maintaining a predetermined image quality level; and
    compositing each sample into a rendering of the image.

3. The method according to claim 2, wherein when forming the reduced path octree, disjoint groups of adjacent voxels of the image are formed into one or more first level nodes, disjoint groups of adjacent ith level nodes of the octree are formed into one or more (i+1)th level nodes, and each ith level node includes a minimum intensity value and a maximum intensity value.

4. The method according to claim 2, wherein when visiting each nth level node,
    if the nth level node is non-empty:
        sampling each lower level node contained therein along the ray; and
    if the lower level node is non-empty:
        repeating the steps of sampling each next lower level node until an empty node or voxel level is reached.

5. The method according to claim 4,
    wherein the minimum intensity value of a node comprises a minimum intensity of each voxel contained within the node,
    wherein the maximum intensity value of a node comprises a maximum intensity of each voxel contained within the node; and
    utilizing the minimum and maximum intensity values to calculate the regional opacity value.

6. The method according to claim 2, wherein the function has variable coefficients that are selected to modulate the regional variation value, the accumulated opacity value, the regional opacity value, and the quality setting.

7. The method of claim 2, wherein the volumetric image comprises a plurality of digitized intensities corresponding to a domain of voxels in a 3-dimensional space.

8. A method executed by a processor for determining a sampling rate, comprising:
    accessing a regional variation value, representing color of a region;
    accessing an accumulated opacity value;
    accessing a quality setting representing a default sampling rate obtained from a memory;
    determining the sampling rate for each voxel as a function of the regional variation value and the accumulated opacity value and the quality setting; and
    dynamically adjusting the sampling rate for each voxel, by adjusting a rate of ray sampling for each voxel, as a function of the regional variation value, the accumulated opacity value, and the quality setting, thereby maintaining a predetermined image quality level.

9. The method of claim 8, wherein the accumulated opacity value represents opacity accumulated over a ray in a volumetric image.

10. The method according to claim 8, wherein the regional variation value represents regional data, and/or alpha variation.

11. The method according to claim 8, wherein the step of accessing a regional variation value further comprises:
  computing color gradients of each color component for each voxel;
  determining a maximum gradient as a function of the color gradients; and
  determining the regional variation value as a function of the maximum gradient.

12. The method according to claim 11, further comprising:
  accessing minimum and maximum data values from an octree node;
  calculating minimum and maximum transfer function values based on the minimum and maximum data values;
  determining a sampling distance representing a distance between two adjacent samples; and
  determining the regional variation value as a function of the minimum and maximum transfer function values and the sampling distance.

13. The method according to claim 8, wherein the step of accessing a regional variation value further comprises:
  generating a maximum regional variation table during pre-processing; and
  generating the regional variation value from the maximum regional variation table.

14. The method according to claim 13, wherein the maximum regional variation table is generated by computing each table entry iteratively.

15. The method according to claim 13, wherein the step of accessing a regional variation value further comprises:
  quantizing the maximum regional variation table by a predetermined factor.

16. The method according to claim 13, wherein the step of accessing a regional variation value further comprises:
  generating a histogram; and
  quantizing the maximum regional variation table as a function of the histogram.

17. The method according to claim 13, wherein the step of accessing a regional variation value further comprises:
  determining a limited range in which a transfer function is defined; and
  quantizing the maximum regional variation table in the limited range.

18. The method according to claim 8, further comprising:
  accessing a regional opacity value; and
  adjusting the sampling rate as a function of the regional opacity value.

19. The method according to claim 18, wherein the step of accessing a regional opacity value further comprises:
  generating an alpha summed area table;
  determining a minimum and a maximum of the alpha summed area table; and
  calculating the regional opacity value from the minimum and the maximum of the alpha summed area table.

20. The method according to claim 8, further comprising:
  adjusting the sampling rate as a function of the quality setting.

21. An apparatus including a processor for rendering an image, comprising:
  means for forming a reduced path octree of a volumetric image having n levels;
  means for visiting each nth level node along a ray through the volumetric image;
  means for generating an accumulated opacity value along each ray while visiting each nth level node;
  means for calculating a regional variation value representing data, color, and alpha variation at each nth level node;
  means for calculating a regional opacity value representing regional opacity at each nth level node;
  means for accessing a quality setting representing a default sampling rate obtained from a memory;
  means for determining a sampling rate, for each voxel, as a function of the regional variation value, the accumulated opacity value, the regional opacity value, and the quality setting;
  means for sampling each voxel intensity at each nth level node at the sampling rate;
  means for dynamically adjusting the sampling rate, for each voxel, by adjusting a rate of ray sampling for each voxel, as a function of the regional variation value, the accumulated opacity value, the regional opacity value, and the quality setting, thereby maintaining a predetermined image quality level; and
  means for compositing each sample into a rendering of the volumetric image.

22. A system for rendering an image, comprising:
  one or more processors;
  one or more memories, operatively coupled to the one or more processors, storing program code that cause the one or more processors to:
    form a reduced path octree of a volumetric image having n levels;
    visit each nth level node along a ray through the volumetric image;
    generate an accumulated opacity value along each ray while visiting each nth level node;
    calculate a regional variation value representing data, color, and alpha variation at each nth level node;
    calculate a regional opacity value representing regional opacity at each nth level node;
    access a quality setting representing a default sampling rate obtained from a memory;
    determine a sampling rate, for each voxel, as a function of the regional variation value, the accumulated opacity value, the regional opacity value, and the quality setting;
    sample each voxel intensity at each nth level node at the sampling rate;
    dynamically adjust the sampling rate, for each voxel, by adjusting a rate of ray sampling for each voxel, as a function of the regional variation value, the accumulated opacity value, the regional opacity value, and the quality setting, thereby maintaining a predetermined image quality level; and
    compose each sample into a rendering of the volumetric image.

23. The system according to claim 22, wherein the one or more memories store additional program code that further cause the one or more processors to:
  iteratively generate a maximum regional variation table during pre-processing; and
  quantize the maximum regional variation table by a predetermined factor based on a histogram of the volumetric image; and
  compute the regional variation value from the maximum regional variation table.

* * * * *